United States Patent
Torjussen et al.

(10) Patent No.: US 10,822,895 B2
(45) Date of Patent: Nov. 3, 2020

(54) MUD RETURN FLOW MONITORING

(71) Applicant: Cameron International Corporation, Houston, TX (US)

(72) Inventors: Kenneth Torjussen, Kristiansand (NO); Kim Andre Henriksen, Kristiansand (NO); Vidar Hestad, Kristiansand (NO)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 208 days.

(21) Appl. No.: 15/950,136

(22) Filed: Apr. 10, 2018

(65) Prior Publication Data
US 2019/0309589 A1 Oct. 10, 2019

(51) Int. Cl.
*E21B 21/08* (2006.01)
*E21B 49/08* (2006.01)
*G01N 11/04* (2006.01)
*G01F 1/72* (2006.01)
*G01F 1/66* (2006.01)
*G01S 13/88* (2006.01)

(52) U.S. Cl.
CPC .......... *E21B 21/08* (2013.01); *E21B 49/0875* (2020.05); *G01F 1/66* (2013.01); *G01F 1/72* (2013.01); *G01N 11/04* (2013.01)

(58) Field of Classification Search
CPC ........ E21B 21/08; E21B 21/065; G01S 13/10; G01S 2007/4043; G01S 13/88; B01D 21/283; B01D 21/34; G01F 1/66
See application file for complete search history.

(56) References Cited

U.S. PATENT DOCUMENTS

| | | | |
|---|---|---|---|
| 4,228,530 A | | 10/1980 | Bergey |
| 4,754,641 A | * | 7/1988 | Orban ................. E21B 21/08 73/152.21 |
| 5,024,105 A | | 6/1991 | Tentler et al. |
| 5,063,776 A | * | 11/1991 | Zanker ................. E21B 21/08 73/152.21 |
| 5,092,167 A | | 3/1992 | Finley et al. |
| 5,285,812 A | | 2/1994 | Morales |
| 5,595,163 A | | 1/1997 | Nogi et al. |
| 5,635,636 A | | 6/1997 | Alexander |
| 6,230,694 B1 | | 5/2001 | Cook et al. |

(Continued)

FOREIGN PATENT DOCUMENTS

| | | |
|---|---|---|
| EP | 0278671 A1 | 8/1988 |
| EP | 0437872 A3 | 7/1991 |

(Continued)

OTHER PUBLICATIONS

International Search Report and Written Opinion for the cross referenced International patent application PCT/US2016/0566472017 dated Jan. 25, 2017.

(Continued)

*Primary Examiner* — Daniel S Larkin
*Assistant Examiner* — Anthony W Megna Fuentes
(74) *Attorney, Agent, or Firm* — Rachel Greene

(57) ABSTRACT

Mud return flow measurements are made from multiple locations using radar-based surface level sensors. Using the inputs from two different sensors on the drilling mud return line provides the ability to calculate the actual flow based on pipe geometry, the speed of the surface of the fluid and parameters such as fluid viscosity and density.

17 Claims, 5 Drawing Sheets

(56) References Cited

U.S. PATENT DOCUMENTS

| | | |
|---|---|---|
| 6,240,787 B1 | 6/2001 | Alexander |
| 6,257,354 B1 | 7/2001 | Schrader et al. |
| 7,114,579 B2 | 10/2006 | Hutchinson |
| 8,863,858 B2 | 10/2014 | Hannegan et al. |
| 8,904,858 B2 | 12/2014 | Pope et al. |
| 2002/0101373 A1 | 8/2002 | Arndt et al. |
| 2009/0032304 A1 | 2/2009 | Groh |
| 2010/0070206 A1 | 3/2010 | Wang et al. |
| 2016/0146653 A1* | 5/2016 | Skelding ................. G01F 15/02 73/861.01 |
| 2017/0101834 A1* | 4/2017 | Henriksen ............... G01P 5/005 |
| 2018/0038179 A1 | 2/2018 | Canty et al. |

FOREIGN PATENT DOCUMENTS

| | | |
|---|---|---|
| EP | 2617939 A1 | 7/2013 |
| WO | 2004/077187 A1 | 9/2004 |
| WO | 2015/053784 A1 | 4/2015 |

OTHER PUBLICATIONS

Office Action for the cross referenced Norwegian patent application 20151376 dated Oct. 19, 2017.

Office Action for the cross referenced Norwegian patent application 20151376 dated Jan. 22, 2018.

International Preliminary Report on Patentability for the cross referenced International patent application PCT/US2016/056647 dated Apr. 17, 2018.

\* cited by examiner

MUD RETURN FLOW MONITORING

TECHNICAL FIELD

The present disclosure relates to systems and methods for mud return flow monitoring in drilling operations. More specifically, the present disclosure relates to systems and methods for calculating mud return flow rates in drilling operations.

BACKGROUND

Hydrocarbon drilling systems utilize drilling fluid or mud (collectively referred to herein as "drilling mud") for drilling a wellbore in a subterranean earthen formation. Specifically, in some applications drilling mud is pumped through a passage in a drill string extending into the wellbore, and down to a drill bit connected to a lower end of the drill string. The drilling mud is ejected from the drill string through ports in the drill bit where the drilling mud is used to cool the drill bit and transport materials cut from the wellbore to the surface via an annulus disposed between an inner surface of the wellbore and an outer surface of the drill string. Upon reaching the surface, the drilling mud is flowed through a mud return line. On the surface, the mud is treated and stored prior to being flowed back into the drill string. The treatments include cuttings removal, using one or more shale shakers as well as other mud treatment devices. In some applications, accurately measuring the level of drilling mud flow through the mud return line is important for monitoring the drilling mud balance in the wellbore. Several different types of sensors are used for measuring the flow rate of drilling mud through the mud return line, including paddle flowmeters featuring a mechanical paddle that rises and falls with the level of drilling mud in the mud return line, and non-contact radar level sensors that transmit a radar pulse that is reflected off of a surface of the drilling mud flowing in the mud return line to determine the amount of mud flowing through the mud return line.

SUMMARY

This summary is provided to introduce a selection of concepts that are further described below in the detailed description. This summary is not intended to identify key or essential features of the claimed subject matter, nor is it intended to be used as an aid in determining or limiting the scope of the claimed subject matter as set forth in the claims.

According to some embodiments, a method for monitoring drilling mud return flow is described. The method includes: measuring flow level of a drilling mud flowing through a mud return conduit at first and second locations using first and second sensor, respectively; estimating a time of flight between the first and second locations based on the flow level measurements; and calculating a flow rate of the drilling mud flowing through the mud return conduit based at least in part on the estimated time of flight, geometry of the mud return conduit and one or more other characteristics of the drilling mud.

According to some embodiments, the time of flight is estimated by identifying corresponding characteristics in data from the first and second sensors, such as a pulse leading edge. In some other embodiments, the corresponding characteristics are identified using a pattern recognition algorithm. The other characteristics used to calculate the flow rate of the drilling mud can include density and/or viscosity.

The first and second sensors can be configured to measure a surface height of the drilling mud flowing through the mud return conduit. The sensors can be non-contact surface radar-based level sensors that use a pressurized gas to reduce or scatter condensation or other matter thereby enhancing accurate measurement by the first and second sensors.

According to some embodiments, the calculated flow rate of the drilling mud can be used for early kick detection. According to some other embodiments, the calculated flow rate of the drilling mud can be used for managing and/or automating one or more shakers.

According to some embodiments, a system for monitoring drilling mud is described. The system includes: a first sensor mounted and configured to measure a flow level of a drilling mud flowing through a mud return conduit at a first location; a second sensor mounted and configured to measure a flow level of the drilling mud flowing through the mud return conduit at a second location; and a processing system configured to estimate a time of flight between the first and second locations and calculate a flow rate of the drilling mud flowing through the mud return conduit based at least in part on the time of flight, geometry of the mud return conduit and one or more other characteristics of the drilling mud. According to some embodiments, a third sensor can be mounted on a flow divider that is used to divide the return mud flow to a plurality of the shakers. The third sensor is configured to measure a surface level of the drilling mud in the flow divider.

BRIEF DESCRIPTION OF THE DRAWINGS

The subject disclosure is further described in the following detailed description, and the accompanying drawings and schematics of non-limiting embodiments of the subject disclosure. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

The particulars shown herein are for purposes of illustrative discussion of the embodiments of the present disclosure only. In this regard, no attempt is made to show structural details of the present disclosure in more detail than is necessary for the fundamental understanding of the present disclosure, the description taken with the drawings making apparent to those skilled in the art how the several forms of the present disclosure may be embodied in practice.

According to some embodiments, mud return flow measurements made from multiple locations are used for redundancy and/or increased accuracy. Using a radar-based sensor provides improved accuracy over the conventional paddle-based sensors. The radar-based sensors are able to detect smaller level changes, as well as provide faster and more accurate feedback. According to some other embodiments, other types of flow sensors can be adapted to obtain accurate mud return flow monitoring as well. By using the inputs from two different sensors on the return line, we are able to calculate the actual flow based on the angle of the pipe, the speed of the surface of the fluid and parameters such as fluid viscosity and density.

Figure 1:
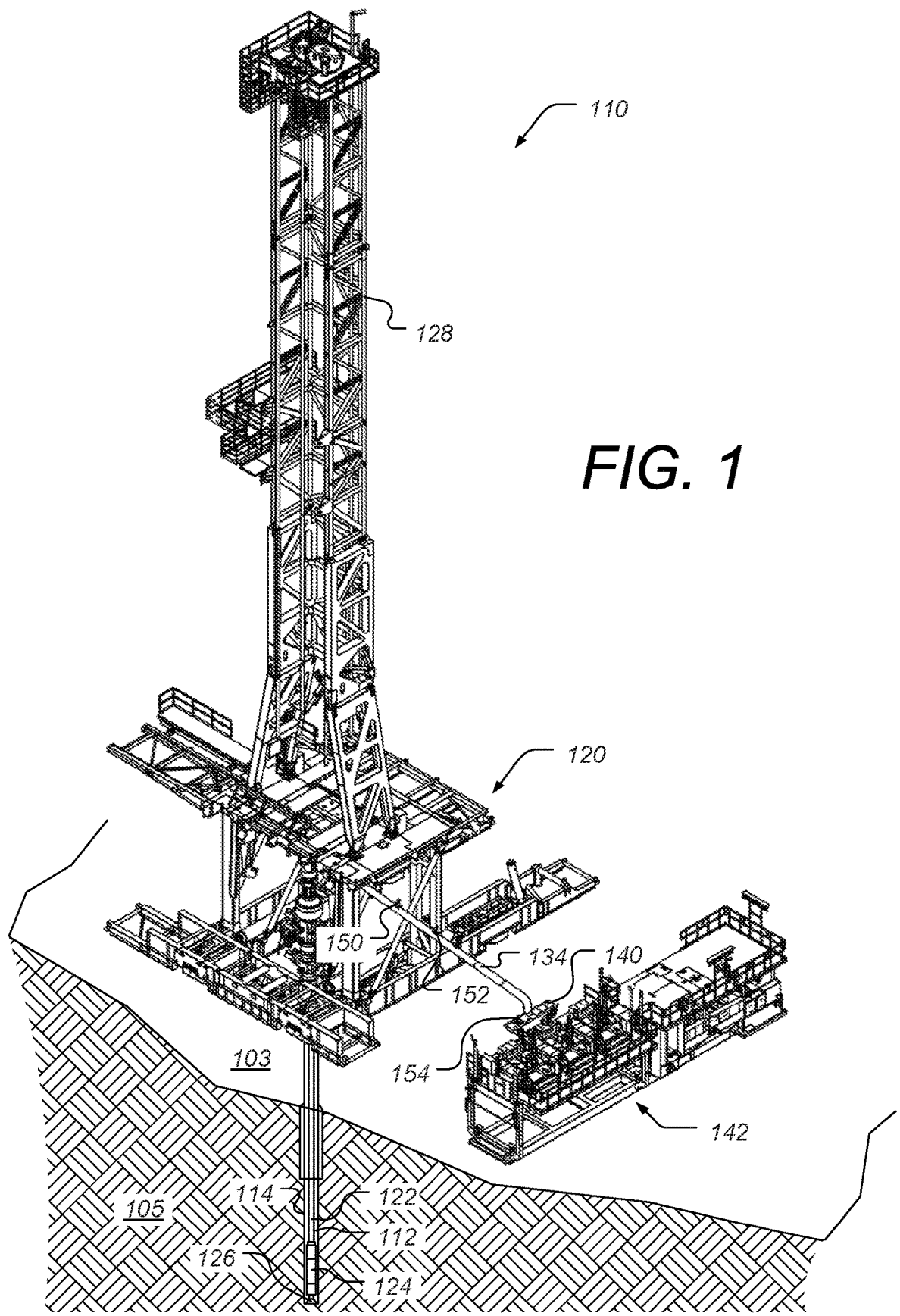
FIG. 1 is a schematic diagram illustrating an embodiment of a well system equipped with mud return flow monitoring, according to some embodiments.

FIG. 1 is a schematic diagram illustrating an embodiment of a well system equipped with mud return flow monitoring, according to some embodiments. The well system 110 can be configured to extract various minerals and natural resources, including hydrocarbons (e.g., oil and/or natural gas), or configured to inject substances into the earthen surface 103 and a subterranean earthen formation 105 via a well or wellbore 112 being formed or developed using well system 110. According to some embodiments, well system 110 is land-based, and according to other embodiments well system 110 is a subsea system, such that the earthen surface 103 is a sea floor. In the embodiment of FIG. 1, well system 110 generally includes a drilling rig or platform 120 disposed at the surface 103, a well or drill string 122 extending downhole from rig 120 through wellbore 112, a bottomhole assembly (BHA) 124 coupled to the lower end of drill string 122, and a drill bit 126 attached to the lower end of BHA 124 and disposed at a lower end of the wellbore 122. Though the description herein may primarily refer to a drill string, it is understood that other types of well or tool strings can extend into the wellbore 122.

In this embodiment, well system 110 further includes a fluid line or mud return line 134, flow divider 140 and shale shakers 142. According to some embodiments, one or more other mud treatment devices can be included such as: sand traps, degassers, desanders, and centrifuges. In some embodiments well system 110 is configured to use old-based drilling mud, water-based drilling mud, or both. In the case where both oil-based and water-based mud can be used, a splitter box (not shown) can be provided along mud return line 134. Other components such as mud tank and mud pumps are provided but not shown. Drilling mud is pumped into an upper end of drill string 122 and through a passage of drill string 122 down to the drill bit 126. The drilling mud is pumped through ports in the drill bit 126 and recirculated to the surface 103 through an annulus of wellbore 112, formed between an inner surface 114 of the wellbore 112 and an outer surface of drill string 122. At the surface 103, the recirculated drilling mud is diverted to the mud return line 134. The returning mud flows into the flow divider 140 which divides the mud such that a separate steam flows to each of the shakers 142, which are configured to remove entrained cuttings and other debris in the drilling mud.

As will be discussed further herein, according to some embodiments the mud return line 134 includes two flow sensor assemblies 150 and 152 configured for measuring the drilling mud passing through the mud return line 134. In particular, according to some embodiments, flow sensor assemblies 150 and 152 are configured to measure the height or fluid level of a fluid flow passing through mud return line 134. According to some embodiments, flow sensor assembly 154 is provided on flow divider 140, which is configured to measure the fluid height within flow divider 140. According to some embodiments, flow sensor assembly 154 is provided instead of either assemblies 150 or 152.

Figure 2:
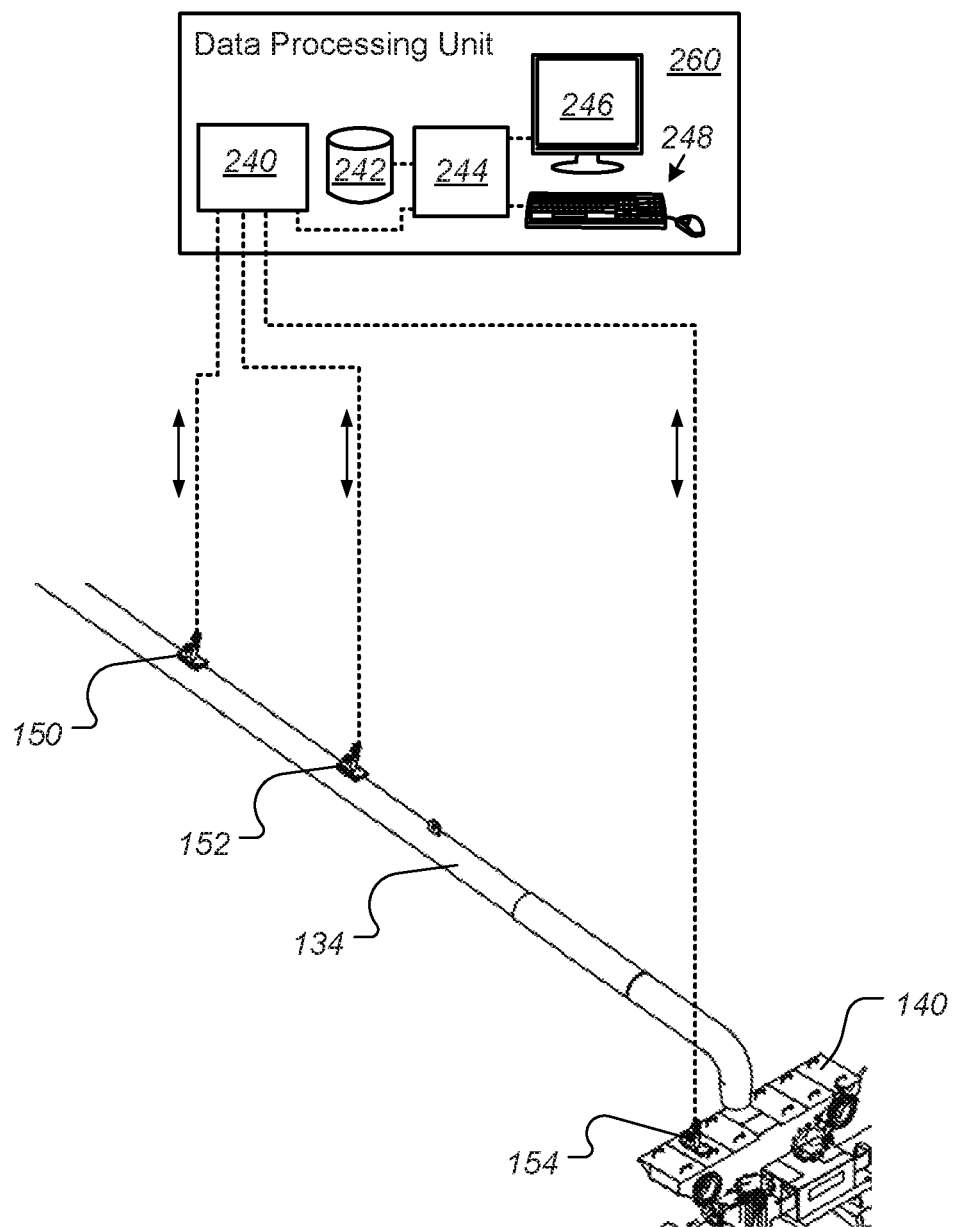
FIG. 2 is a diagram illustrating further aspects of mud return monitoring, according to some embodiments.

FIG. 2 is a diagram illustrating further aspects of mud return monitoring, according to some embodiments. Flow sensor assemblies 150 and 152 are shown installed on mud return line 134, and flow sensor assembly 154 is shown installed on flow divider 140. Readings from each of the sensor assemblies are transmitted to data processing unit 260, which according to some embodiments, includes a central processing system 244, a storage system 242, communications and input/output modules 240, a user display 246 and a user input system 248. Input/output modules 240 are in data communication with the sensor assemblies 150, 152 and 154 as shown by the dotted line. Data processing unit 260 can also be used to send control signals to the sensor assemblies 150, 152 and 154 such as to initiate measurements and/or control pressurized air flow, etc. The data processing unit 260 may be located in well system 110, or may be located in other facilities near the wellsite or in some remote location. According to some embodiments, processing unit 260 is also used to monitor and control at least some other aspects of drilling operations or other functions on well system 110 (shown in FIG. 1).

Figure 3:
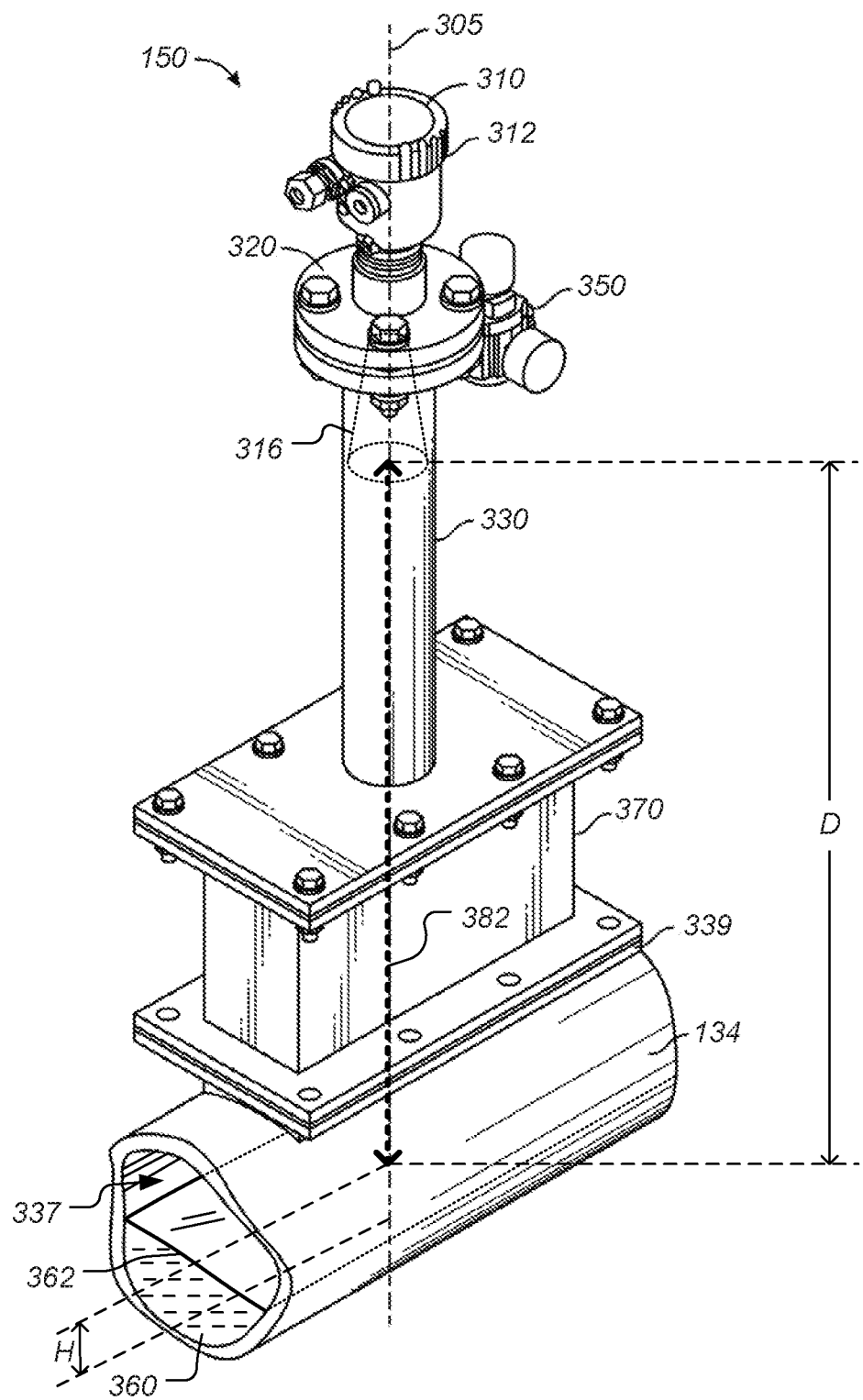
FIG. 3 illustrates aspects of a flow sensor assembly that can be used for mud flow return monitoring, according to some embodiments.

FIG. 3 illustrates aspects of a flow sensor assembly that can be used for mud flow return monitoring, according to some embodiments. Further details of suitable flow sensor assemblies are also described in co-pending U.S. Patent Application Publ. No. 2017/0101834, which is incorporated herein by reference. FIG. 3 shows flow sensor assembly 150 which can also be used for flow sensor assemblies 152 and 154 shown in FIGS. 1 and 2. In the embodiment of FIG. 3, flow sensor assembly 150 has a central or longitudinal axis 305, and generally includes a sensor assembly 310, a sensor housing 330, a pressure regulator assembly 350, and a spacer member 370. Sensor assembly 310 generally includes a flow sensor 312 and a sensor flange 320 for coupling sensor assembly 310 to sensor housing 330. In this embodiment, flow sensor 312 comprises a non-contact radar level measurement sensor, such as the VEGAPULS 62 radar level measurement sensor provided by VEGA Grieshaber KG, located at Am Hohenstein 113, 77761 Schiltach, Germany. However, in other embodiments flow sensor 312 may comprise other flow level measurement sensors known in the art. Flow sensor 312 is configured to continuously measure the height H of fluid 360 (e.g., drilling mud) passing through an internal passage 337 of mud return line 134. By measuring the height H of the fluid 360, in multiple locations, the flow rate of fluid 360 through mud return line 134 may be determined in light of the dimensions of mud return line 134 and the properties (e.g. viscosity and density) of fluid 360 flowing therein. In this embodiment flow sensor 312 is configured to determine the value of H by transmitting a radar signal 382 that is reflected off the surface 362 of the fluid 360 back to flow sensor 312, providing flow sensor 312 with the distance between flow sensor 312 and the surface 362 of fluid 360. By calibrating flow sensor 312 with the height of sensor housing 330, spacer 370, and the size of mud return line 134, height H of the fluid 360 may thereby be computed.

According to this embodiment, flow sensor 312 includes an electronics module coupled to an antenna 316 extending therefrom, where antenna 316 has a generally conical outer surface. The electronics module includes electronics (e.g., a processor, memory, etc.) for operating flow sensor 312 while antenna 316 is configured to transmit and receive electromagnetic (e.g., radar) signals. Flange 320 is affixed to an outer surface of the electronics module and is configured to releasably couple flow sensor 312 with sensor housing 330.

According to some embodiments, a fluid inlet (not shown) is configured to couple with pressure regulator assembly 150 and to provide a fluid conduit for inlet of pressurized fluid to a radial port (not shown). The radial port is configured to act as a nozzle, increasing the velocity of the fluid flowing into the interior of sensor housing 330. A high velocity jet, stream, or spray of fluid against the inner surface of sensor housing 330 and/or the outer surface of antenna 316 is used to remove condensation, humidity, and other materials (e.g., dirt, grime, particulates, fluids, etc.) disposed thereon. According to some embodiments, compressed air is used to keep the humid air away from the metal horn 316 on the sensor. The air-pressure being adjustable with a regulator assembly 150.

Using the accurate input data from the two sensor assemblies 150 and 152 on the mud return line 134 (shown in FIGS. 1 and 2) separated by a known fixed distance, the level structure or pattern measured by the first sensor can be compared with that measured by the second sensor. By identifying the time of flight between the two sensors the speed of the surface liquid can be calculated.

According to some embodiments, sensors types other than radar-based sensors could be configured to provide input for the flow rate calculations described herein. Examples include paddle-base surface level detectors and ultrasonic transducers.

Figure 4A:
FIGS. 4A-4D are plot diagrams illustrating data from flow sensors for monitoring return mud flow, according to some embodiments.
Figure 4B:
Figure 4C:
Figure 4D:
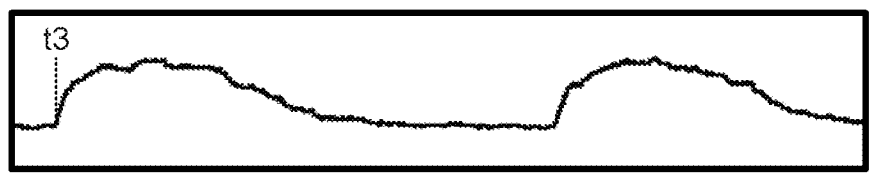

FIGS. 4A-4D are plot diagrams illustrating data from flow sensors for monitoring return mud flow, according to some embodiments. FIG. 4A shows example data from a first sensor assembly (e.g. 150 in FIGS. 1 and 2) over a long time span, such as 3.5 hours. FIG. 4B shows the same data measured by the first sensor assembly over a shorter time span, such as 30 minutes. FIGS. 4C and 4D shows data measured by second and third sensor assemblies respectively for a time span similar to that shown in FIG. 4B. FIG. 4C is example data from a sensor assembly (e.g. 152 in FIGS. 1 and 2) that is mounted downstream on the mud return line from the first sensor assembly. FIG. 4D is example data from a sensor assembly (e.g. 154 in FIGS. 1 and 2) that is mounted on a flow divider downstream of the first and second sensor assemblies. By mounting the sensor assemblies in various locations, detection of the drilling mud slowly moving through the rig circulation system can be monitored.

According to some embodiments, the time of flight between any two sensor locations can be calculated by detecting a prominent characteristic, such as a leading edge, of the measured waveforms. In FIGS. 4B, 4C and 4D, the leading edge of first pump stroke is shown by t1, t2, and t3 respectively. The time of flight between any two sensors can simply be calculated by the difference between the corresponding leading edge time. According to some other embodiments, other techniques can be used to measure corresponding locations in the measured waveforms. For example, pattern recognition algorithms can be employed to detect similarities between the waveforms at different measurement locations and the time of flight can then be calculated. From the time of flight and the known distance between the sensor locations the speed of the surface of the liquid can be calculated.

Figure 5:
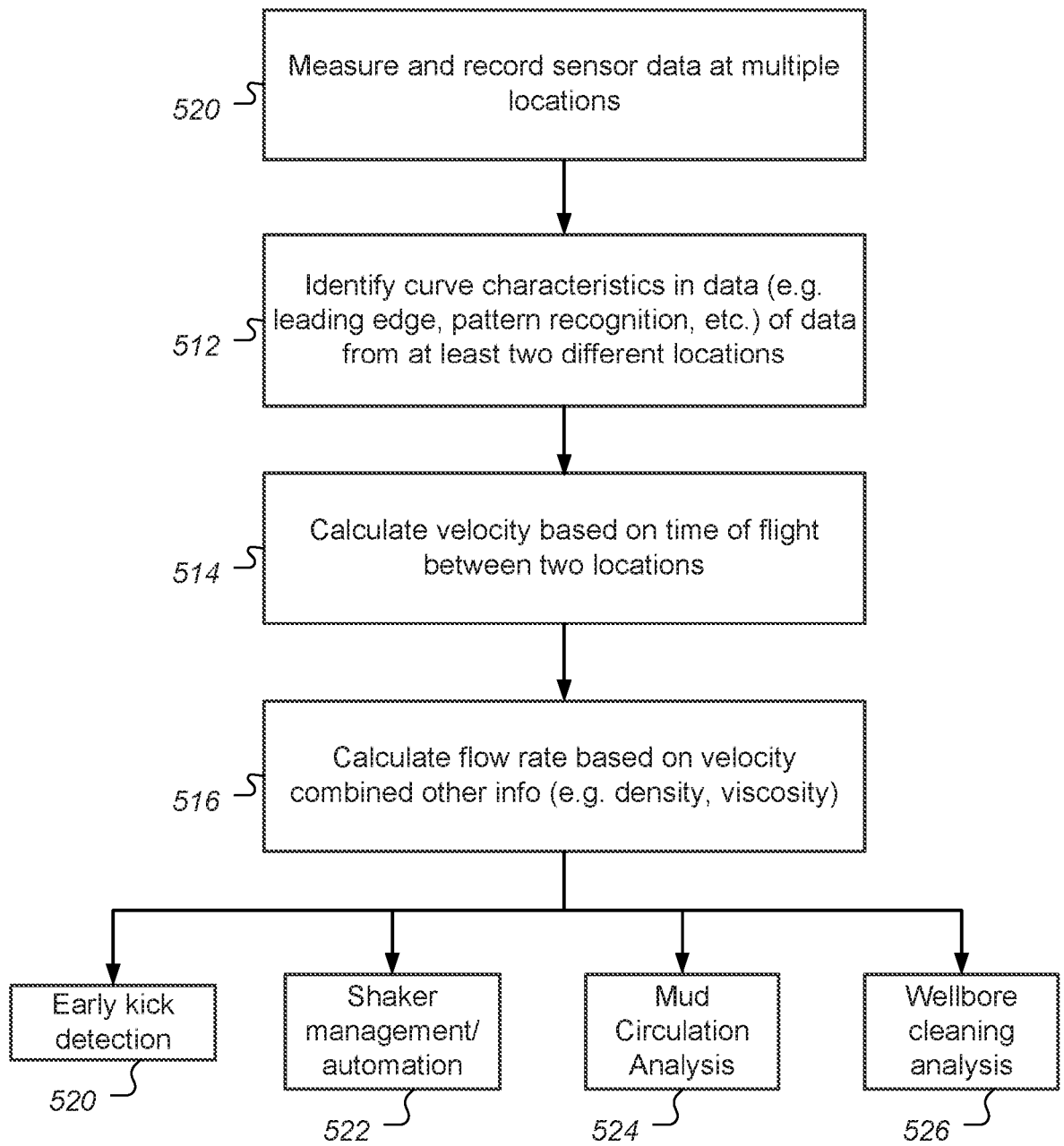
FIG. 5 is a block diagram showing aspects of return mud flow monitoring, according to some embodiments.

FIG. 5 is a block diagram showing aspects of return mud flow monitoring, according to some embodiments. In block 520 the data from flow sensors mounted at least two locations along the drilling mud return path are measured and recorded. Examples include sensor assemblies 150, 152 and 154 shown in FIGS. 1 and 2. In block 512, characteristics of the recorded data that correspond to the same flow pulse at each sensor location are identified. Examples of characteristics include the identifying the leading edge of a pump stroke at each location. Another example is using pattern recognition algorithm(s) to identify one or more corresponding features in the waveforms for each location. In block 514, the time of flight is calculated from the time difference between the identified characteristics in each location. The time of flight and the known distance between the locations is used to calculate a velocity or speed at which the surface of the fluid within the mud return path is travelling. In block 516, the overall flow rate for the drilling mud is calculated from the surface velocity combined with other information such as the pipe geometry and slope, fluid density and fluid viscosity. In blocks 520, 522, 524 and 526, the flow rate information can be used for a number of applications that include early kick detection, shaker management and automation, mud circulation analysis, and wellbore cleaning analysis.

Following is further detail on how mud flow rate can be calculated from the speed of surface liquid (block 516 in FIG. 5). From the known geometry of the pipeline (e.g. mud return line 134 in FIGS. 1 and 2) and the surface height of the fluid therein, we can calculate the area of the returning mud. The slope of the pipeline is also known. Typical standard mathematical modeling can be used to give the passing fluids total volume returning from the wellbore. Properties such as viscosity and density will affect the fluid behavior within the pipeline. To calculate a corrected and total speed of the fluid, we can use temperature, viscosity and specific gravity, which is typically readily available from a mud logger or applicable measurements can be done. With parameters such as these, a good understanding of the fluid behavior and speed inside the pipeline can be gained. Below the fluid surface, friction with respect to the pipeline walls will slow the outer portion of the passing fluid compared to the higher speed inner portion. Knowing both speed and the returning mass area gives us returning volume with relatively high accuracy.

According to some embodiments, measurements of the fluid flow rate through mud return line are used to monitor the drilling fluid balance in the wellbore. The drilling fluid balance in the wellbore may be monitored for detecting the presence of a "kick" in the wellbore (block 520 in FIG. 5). For instance, if the calculated flow rate of fluid through the mud return line exceeds the flow rate of fluid entering the drill string, then a fluid or gas influx (i.e., a "kick") has taken place, with fluid or gas entering the wellbore from the subterranean formation. The presence of a fluid or gas influx into the wellbore may necessitate corrective action to regain control over the wellbore of well system.

The use of accurate sensors gives us the possibility to monitor small changes in the entire mud loop. The correspondence between patterns in the return flow and flow divider can be used to confirm the validity of the readings. According to some embodiments, measurement data can be used to analyze each pump stroke through the rig circulating system. This pump stroke tracking analysis (e.g. block 524 in FIG. 5) can be as simple as detecting and counting passing mud pump stroke patterns, enabling the ability to more accurately control rig drilling fluids volumes. In real-time we can measure returning volume before the shale shakers and after when drilling cuttings are removed. According to some embodiments, a wellbore cleaning indication (e.g. block 526 in FIG. 5) can be developed with more precision than existing methods.

According to some embodiments, data from the flow sensor assemblies (e.g. 150, 152 and/or 154 in FIGS. 1 and 2) can be used for to manage and/or automate the shale shakers (e.g. 142 in FIG. 1). Automation of shale shakers (e.g. block 522 in FIG. 5) can be enabled through the accurate readings of the flow sensors as described herein.

For example, the calculated return mud flow rates from the upstream sensors (e.g. 150 and 152 in FIGS. 1 and 2) can be used, along with other fluid property information, to predict when to automatically start or stop individual shale shakers, and/or to adjust the flow going each shale shaker to reduce the risk of shakers running empty and therefore reducing the cost of screens and other mud treatment components. According to some embodiments, the sensor assembly on the flow divider (e.g. 154) is used to verify that flow conditions predicted by the upstream sensors and shaker management scheme are being effective. Providing shaker management and/or automation can thus provide a health safety and environment (HSE) for operators and reduce rig operational cost.

While the subject disclosure is described through the above embodiments, it will be understood by those of ordinary skill in the art, that modification to and variation of the illustrated embodiments may be made without departing from the concepts herein disclosed.

What is claimed is:

1. A method for monitoring drilling mud return flow comprising:
   measuring flow level of a drilling mud flowing through a mud return conduit at a first and second locations using a first and second sensors, respectively;
   estimating a time of flight between the first and second locations based on the flow level measurements; and
   calculating a flow rate of the drilling mud flowing through the mud return conduit based at least in part on the estimated time of flight, geometry of the mud return conduit and one or more other characteristics of the drilling mud.

2. The method according to claim 1 wherein the estimating of the time of flight includes identifying corresponding characteristics in data from the first and second sensors.

3. The method according to claim 2 wherein the corresponding characteristics include a pulse leading edge.

4. The method according to claim 2 wherein the corresponding characteristics are identified using at least one pattern recognition algorithm.

5. The method according to claim 1 wherein the one or more other characteristics of the drilling mud include density and/or viscosity.

6. The method according to claim 1 wherein the first and second sensors are configured to measure a surface height of the drilling mud flowing through the mud return conduit.

7. The method according to claim 6 wherein the first and second sensors are non-contact surface radar-based level sensors.

8. The method according to claim 7 wherein the first and second sensors are configured to inject a pressurized gas at a radar antenna to reduce or scatter condensation thereby enhancing accurate measurement by the first and second sensors.

9. The method according to claim 1 further comprising detecting occurrence of kick based in part on the calculated flow rate of the drilling mud.

10. The method according to claim 1 further comprising managing one or more shakers based at least in part on the calculated flow rate of the drilling mud.

11. The method according to claim 10 wherein the managing includes automatically selecting which of a number of shakers should be used based at least in part on the calculated flow rate of the drilling mud.

12. The method according to claim 10 wherein the managing includes automatically selecting an angle for one or more of the shakers based at least in part on the calculated flow rate of the drilling mud.

13. A system for monitoring drilling mud return flow comprising:
    a first sensor mounted and configured to measure a flow level of a drilling mud flowing through a mud return conduit at a first location;
    a second sensor mounted and configured to measure a flow level of the drilling mud flowing through the mud return conduit at a second location; and
    a processing system configured to estimate a time of flight between the first and second locations and calculate a flow rate of the drilling mud flowing through the mud return conduit based at least in part on the time of flight, geometry of the mud return conduit and one or more other characteristics of the drilling mud.

14. The system according to claim 13 wherein the one or more other characteristics of the drilling mud include density and/or viscosity.

15. The system according to claim 13 wherein the first and second sensors are non-contact surface radar-based level sensors.

16. The system according to claim 13 wherein the processing system is further configured to manage one or more shakers based at least in part on the calculated flow rate of the drilling mud.

17. The system according to claim 16 further comprising a third sensor mounted on a flow divider used to divide the return mud flow to a plurality of the one or more shakers, the third sensor configured to measure a surface level of the drilling mud in the flow divider.

* * * * *